United States Patent
Joshi et al.

(10) Patent No.: US 8,392,361 B2
(45) Date of Patent: Mar. 5, 2013

(54) CENTRALIZED MANAGEMENT OF VIRTUAL MACHINES

(75) Inventors: Kiran Joshi, San Jose, CA (US); Sirish Raghuram, San Jose, CA (US); Bich Cau Le, San Jose, CA (US); Gopala Suryanarayana, Sunnyvale, CA (US)

(73) Assignee: VMware, Inc., Palo Alto, CA (US)

(*) Notice: Subject to any disclaimer, the term of this patent is extended or adjusted under 35 U.S.C. 154(b) by 762 days.

(21) Appl. No.: 12/274,303

(22) Filed: Nov. 19, 2008

(65) Prior Publication Data

US 2010/0036889 A1  Feb. 11, 2010

Related U.S. Application Data

(63) Continuation-in-part of application No. 12/189,737, filed on Aug. 11, 2008, now Pat. No. 8,171,278, and a continuation-in-part of application No. 12/246,284, filed on Oct. 6, 2008, now Pat. No. 8,209,343.

(51) Int. Cl.
*G06F 7/00* (2006.01)
*G06F 17/30* (2006.01)

(52) U.S. Cl. .................. 707/609; 709/203; 718/1
(58) Field of Classification Search .......... None
See application file for complete search history.

(56) References Cited

U.S. PATENT DOCUMENTS

| | | | |
|---|---|---|---|
| 6,748,534 B1 * | 6/2004 | Gryaznov et al. .......... 713/188 |
| 7,136,981 B2 | 11/2006 | Burch et al. | |
| 7,254,596 B2 * | 8/2007 | De Spiegeleer .......... 707/758 |
| 7,392,261 B2 * | 6/2008 | Clark et al. .......... 707/821 |
| 7,624,240 B1 | 11/2009 | Colbert et al. | |
| 7,814,307 B2 | 10/2010 | Powell et al. | |
| 7,962,918 B2 * | 6/2011 | Schaefer et al. .......... 719/313 |
| 2002/0129047 A1 * | 9/2002 | Cane et al. .......... 707/204 |
| 2005/0114870 A1 | 5/2005 | Song et al. | |
| 2005/0132365 A1 * | 6/2005 | Madukkarumukumana et al. .......... 718/1 |
| 2007/0112787 A1 * | 5/2007 | Burton et al. .......... 707/10 |
| 2008/0184225 A1 * | 7/2008 | Fitzgerald et al. .......... 718/1 |
| 2008/0270483 A1 | 10/2008 | Kumar et al. | |
| 2009/0030957 A1 | 1/2009 | Manjunath | |
| 2009/0150332 A1 * | 6/2009 | Zhuang et al. .......... 707/1 |
| 2009/0193074 A1 * | 7/2009 | Lee .......... 709/203 |
| 2009/0198704 A1 * | 8/2009 | Landberg .......... 707/10 |
| 2009/0276774 A1 | 11/2009 | Kinoshita | |
| 2010/0011200 A1 | 1/2010 | Rosenan | |
| 2010/0037041 A1 | 2/2010 | Joshi et al. | |
| 2010/0088328 A1 | 4/2010 | Joshi et al. | |

OTHER PUBLICATIONS

Ben Pfatt et al., "Virtualization Aware File Systems: Getting Beyond the Limitations of Virtual Disks," UNSENIX Association, NSDI '06: 3rd Symposium on Networked Systems Design and Implementation, May 2006, pp. 353-366 http://www.usenix.org/events/nsdi06/tech/tech.html.

* cited by examiner

*Primary Examiner* — Khanh Pham
*Assistant Examiner* — Azam Cheema

(57) ABSTRACT

Virtual machines are managed in centralized manner. Files that are shared by multiple virtual machines are stored in a central storage unit and a management program is executed on one or more of these files on a per file basis. The management program is executed on a file if an IO operation is issued for that file. A namespace map is used to provide a mapping of filenames used by the different virtual machines to filenames used by the central storage unit.

21 Claims, 10 Drawing Sheets

CENTRALIZED MANAGEMENT OF VIRTUAL MACHINES

CROSS-REFERENCE TO RELATED APPLICATIONS

This application is a continuation-in-part of U.S. patent application Ser. No. 12/189,737, filed Aug. 11, 2008, and a continuation-in-part of U.S. patent application Ser. No. 12/246,284, filed Oct. 6, 2008, both of these applications are being incorporated herein for all purposes.

BACKGROUND

Conventional virtual machines (VMs) employ virtual disks as its primary form of storage. Virtual disks provide fully encapsulated storage for the virtual machines, thereby simplifying management tasks such as versioning and rollback. They also provide other advantages such as mobility (VMs can be easily moved and/or copied) and isolation (storage domains of multiple VMs are isolated from each other).

Consequently, in a virtual machine system having multiple VMs, each VM has stored in its virtual disk, operating system files and files that are used in providing management services, such as anti-virus scanning, backup, patching, and versioning, to the VM. When a management service is invoked in response to a file operation issued by a VM, the VM executes the program associated with the invoked management service. For example, in response to an "open file" operation, the VM executes an anti-virus scanning program on the file designated to be opened.

The inventors have observed certain inefficiencies with providing management services within the virtual disk framework described above. First, management programs consume both CPU and memory resources allocated to the virtual machines. Second, the installation of management programs (occurring as a result of a software vendor change, for example) and administration of updates to the management programs can be cumbersome because the process has to be repeated for each virtual machine.

Software vendors are providing centralized software to automate the process of administering updates, but at best, this is a partial solution because it does not address the inefficiency associated with resource consumption.

A virtualization aware file system, known as Ventana, extends a conventional distributed file system to virtual machine environments and thus combines the sharing benefits of a distributed file system with versioning, access control, and disconnected operation features that are available with virtual disks. A detailed description of Ventana is provided in a publication from Stanford University, Department of Computer Science, authored by Ben Pfaff, et al. The publication is entitled "Virtualization Aware File Systems: Getting Beyond the Limitations of Virtual Disks." Although Ventana provides a file system framework that could be used to address some of the issues with conventional delivery of management services, the publication is silent about how this can be done using Ventana.

SUMMARY

One or more embodiments of the invention provide a centralized way of managing virtual machines. By centrally managing virtual machines, overall CPU and memory usage is reduced and administration of programs that provide management services to virtual machines is simplified.

According to an embodiment of the invention, files that are shared by multiple virtual machines are stored in a central storage unit and a management program, e.g., anti-virus scanning, backup, patching, or versioning, is executed on one or more of these files on a per file basis. A namespace map is used to provide a mapping of filenames used by the different virtual machines to filenames used by the central storage unit.

According to another embodiment of the invention, a management program is executed on a file stored in central storage unit if a virtual machine requests an IO operation on that file. A namespace map is used to provide a mapping of that file's filename used by the virtual machine to the filename used by the central storage unit.

A system, according to an embodiment of the invention, that implements the methods described above, includes a host computer having one or more virtual machines configured therein, a switching layer computer connected to the host computer and configured to manage a namespace map for the virtual machines in the host computer, the namespace map defining a mapping of filenames used by the virtual machines in the host computer to filenames used by the central storage unit, a central storage unit connected to the host computer and the switching layer computer, and a management services computer that is programmed to execute programs for managing the virtual machines using the namespace map and files stored in the central storage unit.

DETAILED DESCRIPTION

Figure 1:
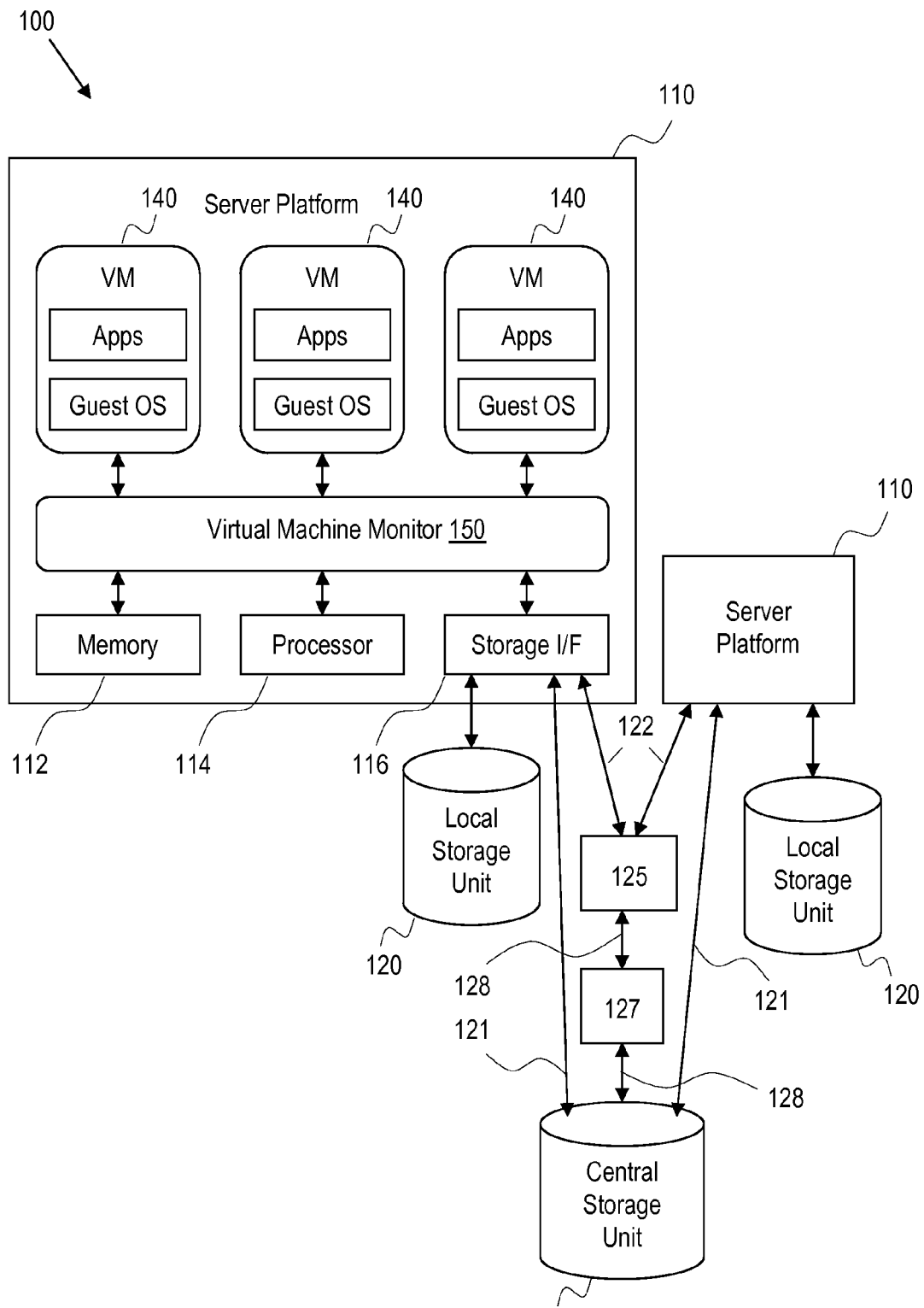
FIG. 1 is a functional block diagram of a computer system in which one or more embodiments of the invention may be practiced.

FIG. 1 is a functional block diagram of a computer system 100 in which one or more embodiments of the invention may be practiced. Computer system 100 includes server platforms 110 (also referred to herein as a "host computer"), a local storage unit 120 for each server platform, and a central storage unit 130 that is shared by server platforms 110. Local storage unit 120 and central storage unit 130 may be implemented as network attached storage (NAS) or storage area network (SAN) arrays. Local storage unit 120 is dedicated to and provides storage for the server platform to which it is connected, and central storage unit 130 provides shared storage to all server platforms 110. Central storage unit 130 represents one or more storage servers.

A server platform is connected to central storage unit 130 through an out-of-band IO path 121 and an in-band IO path that includes IO path 122, a switching layer computer 125, a management plug-in framework (MPF) computer 127, and IO paths 128. Switching layer computer 125 carries out namespace mapping, as will be described below. MPF computer 127 hosts a management plug-in framework, described in further detail below, and provides a user interface for system administrators for configuration and reporting purposes. IO paths 121, 122, 128 are communication paths that are based on some file sharing protocol, such as NFS (Network File System) and CIFS (Common Internet File System).

Each of server platforms 110 has conventional components of a server computer, and may be implemented as a cluster of multiple server computers. Each server platform has configured therein one or more virtual machines 140 that share hardware resources of the server platform, such as system memory 112, processor 114 and storage interface 116. Examples of storage interface 116 are a host bus adapter and a network file system interface. Virtual machines 140 run on top of a virtual machine monitor 150, which is a software interface layer that enables sharing of the hardware resources of the server platform by virtual machines 140. Virtual machine monitor 150 may run on top of the server platform's operating system or directly on hardware components of the server platform. Together, virtual machines 140 and virtual machine monitor 150 create virtualized computer systems that give the appearance of being distinct from the server platform and from each other. Each virtual machine includes a guest operating system and one or more guest applications. The guest operating system is a master control program of the virtual machine and, among other things, the guest operating system forms a software platform on top of which the guest applications run. A virtual disk for each of the virtual machines 140 is maintained within local storage unit 120.

Figure 2:
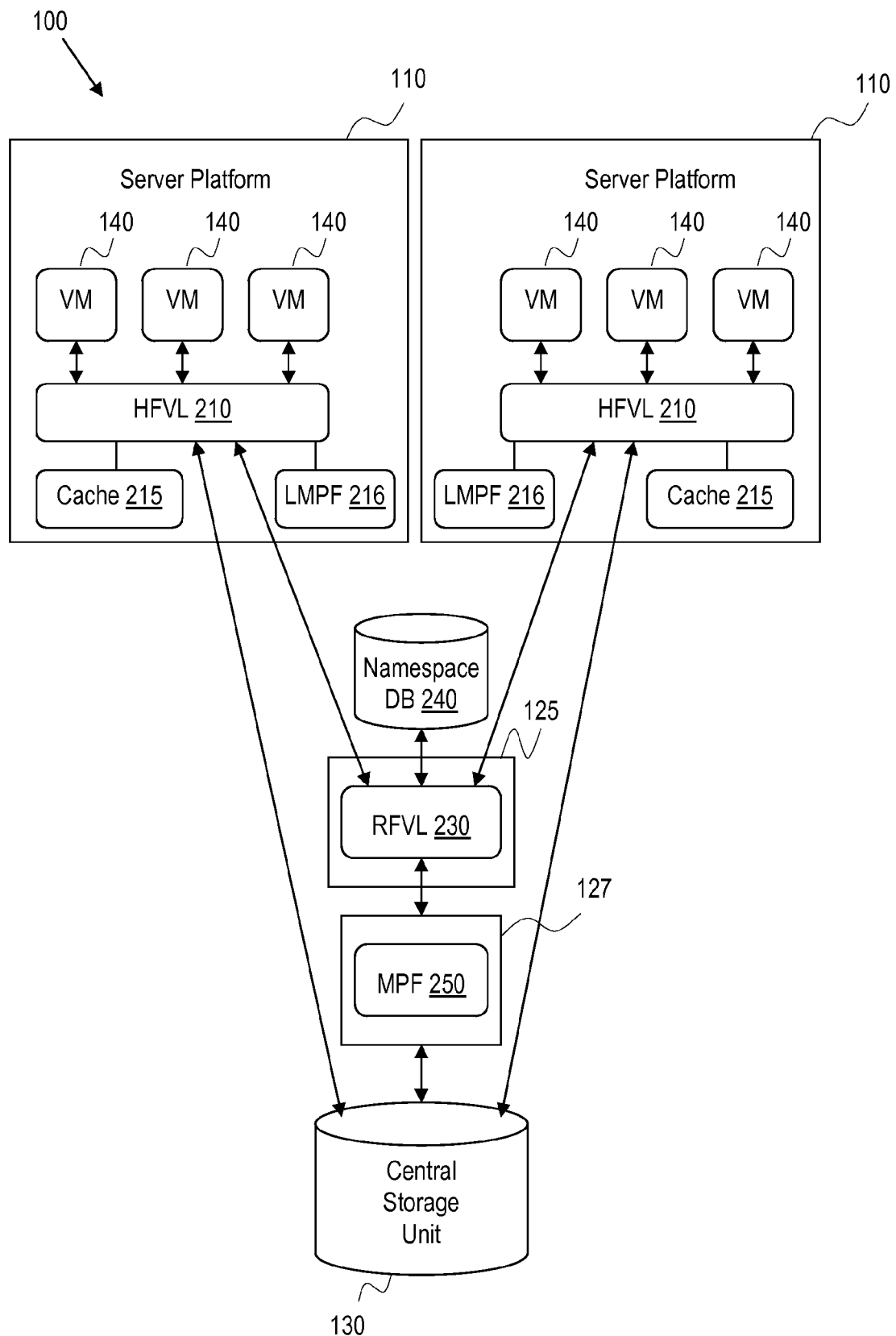
FIG. 2 illustrates various components of the computer system of FIG. 1 that support centralized management of virtual machines.

FIG. 2 illustrates various components of the computer system of FIG. 1 that support centralized management of virtual machines. These components include a host file virtualization layer (HFVL) 210 implemented in each server platform and a remote file virtualization layer (RFVL) 230 implemented in switching layer computer 230. A cache memory unit 215 is provided to support namespace mapping that is carried out by the server platform and a namespace database 240 is provided to support namespace mapping that is carried out by switching layer computer 220. Namespace database 240 is used to persistently store the primary namespace map for computer system 100 and contains all of the mapping information needed to correctly map filenames used by VMs 140 to filenames used by central storage unit 130. Cache memory unit 215 contains only a portion of the primary namespace map.

HFVL 210 is a software component that resides on an operating system for the server platform. HFVL 210 acts as a gateway between a file system driver running in the guest operating system of VMs 140 and central storage unit 130. It also interacts with RFVL 230 to implement the guest namespace virtualization and employs cache memory unit 215 to cache namespace maps as they are resolved by RFVL 230.

RFVL 230 is a software component that with the help of namespace database 240 implements guest namespace virtualization. Guest namespace virtualization is a mechanism to construct and control a virtual tree of files and folders seen by the VM. It comprises of a map between filenames and directory tree structure seen by the VM and their location on central storage 130. There need not be an exact mapping of a file path that a guest operating system can operate on and the file path on central storage 130. For example, a guest file "c:/foo/bar.txt" can be mapped to "/server/share/snapshot/1/2/3/xyz.lmnop" on the central storage. RFVL 230 stores this mapping information in namespace database 240 and uses it to resolve file paths referenced by the VM.

The guest namespace can be constructed using two types of virtualization techniques, static and dynamic. Static virtualization is that part where the namespace map cannot be altered while the guest operating system of the VM is running. This prevents newer versions of files getting introduced in the guest operating system while they are in use and thus breaking runtime dependencies. Dynamic virtualization is a mechanism where names and directory trees can be added or modified in the guest namespace while the guest operating system of the VM is running. This permits applications to be dynamically pushed to the VM or removed from the VM if they are no longer required. Dynamic virtualization is achieved by updating the namespace map in namespace database 240 and invalidating the namespace maps stored in cache memory unit 215.

MPF 250 is a framework where management services are plugged in. MPF 250 exposes a register API that management services utilize to register callbacks on specific events, such as file open, file close, file create, file delete, and file rename. For example, an anti-virus scanning program might register callbacks for file open and file close events. RFVL 230 notifies MPF 250 about various events and MPF 250 invokes callbacks of appropriate services. The callbacks can potentially invoke APIs that are specific to management services to implement the service. MPF 250 interacts with central storage unit 130 to access physical files.

MPF 250 also provides a way for system administrators to subscribe to notifications from the registered management services. For this purpose, MPF 250 defines a schema of errors to which the management services conform. For example, in the case where an anti-virus detection service detects an infected file in one of the managed VMs, the service returns an error status to MPF 250 per its schema. MPF 250 then interacts with the system administrator using various alerting mechanisms, such as e-mail or SMS notifications or alerts in the administrative interface. Upon receiving these alerts, the system administrator may take actions using the administrative interface or other such mechanisms.

Local MPF (LMPF) 216 is a miniature version of MPF and executes within server platform 110. It interacts with HFVL 210 to provide management services that can be executed within server platform 110.

In one embodiment of the invention, a guest agent, a software that is running inside the guest OS, interacts with users logged into the guest OS and notifies them about various events occurring in the system. For example, when a virus is detected and the system administrator is alerted as described above, the guest agent pops up a message box informing the users about the virus and the infected file. Optionally, users can act on these notifications.

Figure 3:
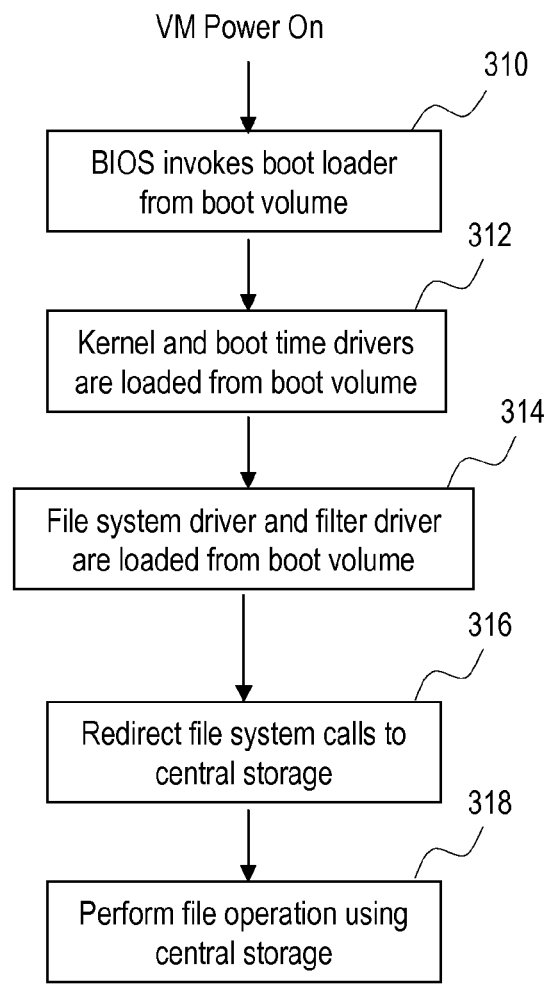
FIG. 3 illustrates a process for loading an operating system from a central storage unit.

A process of loading an operating system into system memory (known as a boot process) from central storage unit 130 is illustrated in FIG. 3. The process begins at step 310 with the system BIOS (Basic Input/Output System) invoking a boot loader from a boot disk or, more generally, a boot volume. At step 312, the boot loader loads the kernel of the operating system and boot time drivers into system memory from the boot volume. At step 314, the boot loader loads into system memory a file system driver and a file system filter driver. The file system driver is the driver for the native file system of the operating system, e.g., NTFS for Windows NT operating systems. The file system filter driver is a software component that runs on top of the file system driver and redirects file system calls made to the file system. In the first embodiment of the invention, file system calls made to the file system are redirected to a central storage unit. As a result, when file system calls are made after the file system filter driver has been loaded into system memory, the file system calls are redirected to a central storage unit (step 316) and file operations are carried out using the central storage unit (step 318). For example, when file system calls are made to load the operating system files that remain unloaded after step 314, the remaining operating system files are loaded into system memory from the central storage unit instead of the boot volume. Also, file operations that are issued after the boot process has completed are performed using the central storage unit.

Figure 4:
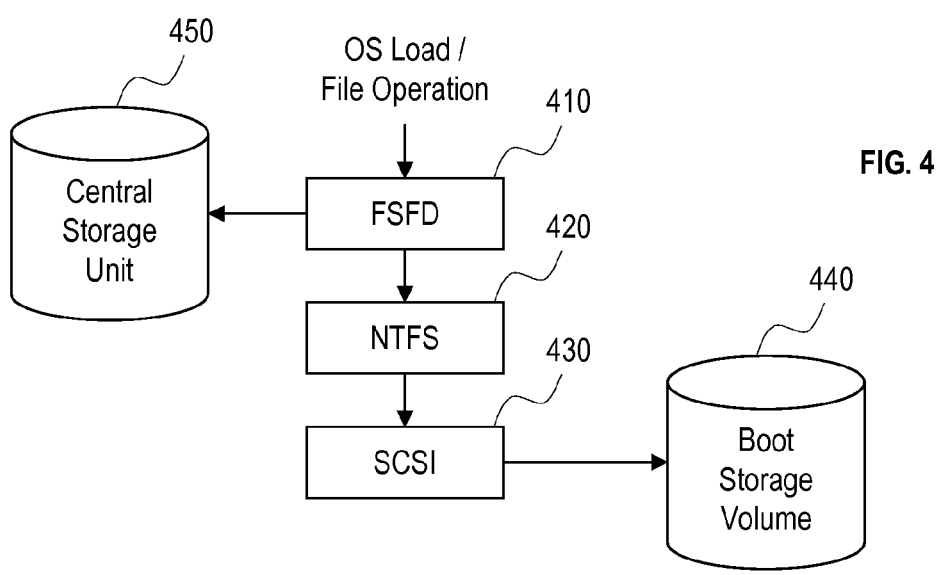
FIG. 4 schematically illustrates a file input/output process after a file system driver and a file system filter driver have been loaded.

FIG. 4 schematically illustrates a file input/output process after the file system driver and the file system filter driver have been loaded into system memory. In FIG. 4, the file system filter driver is shown as FSFD 410, the NTFS file system driver as NTFS 420, and a SCSI driver as SCSI 430. Before FSFD 410 is loaded into system memory, files are accessed and loaded from a boot storage volume 440. When a virtual machine is being booted, boot storage volume 440 may be a portion of a virtual disk associated with the virtual machine or may be streamed in using PXE/TFTP protocols. After FSFD 410 is loaded into system memory and runs on top of NTFS 420, FSFD 410 redirects file accesses to a central storage unit 450. In the embodiment illustrated in FIG. 1, boot storage volume 440 is contained within local storage unit 120 and central storage unit 450 corresponds to central storage unit 130.

Figure 5A:
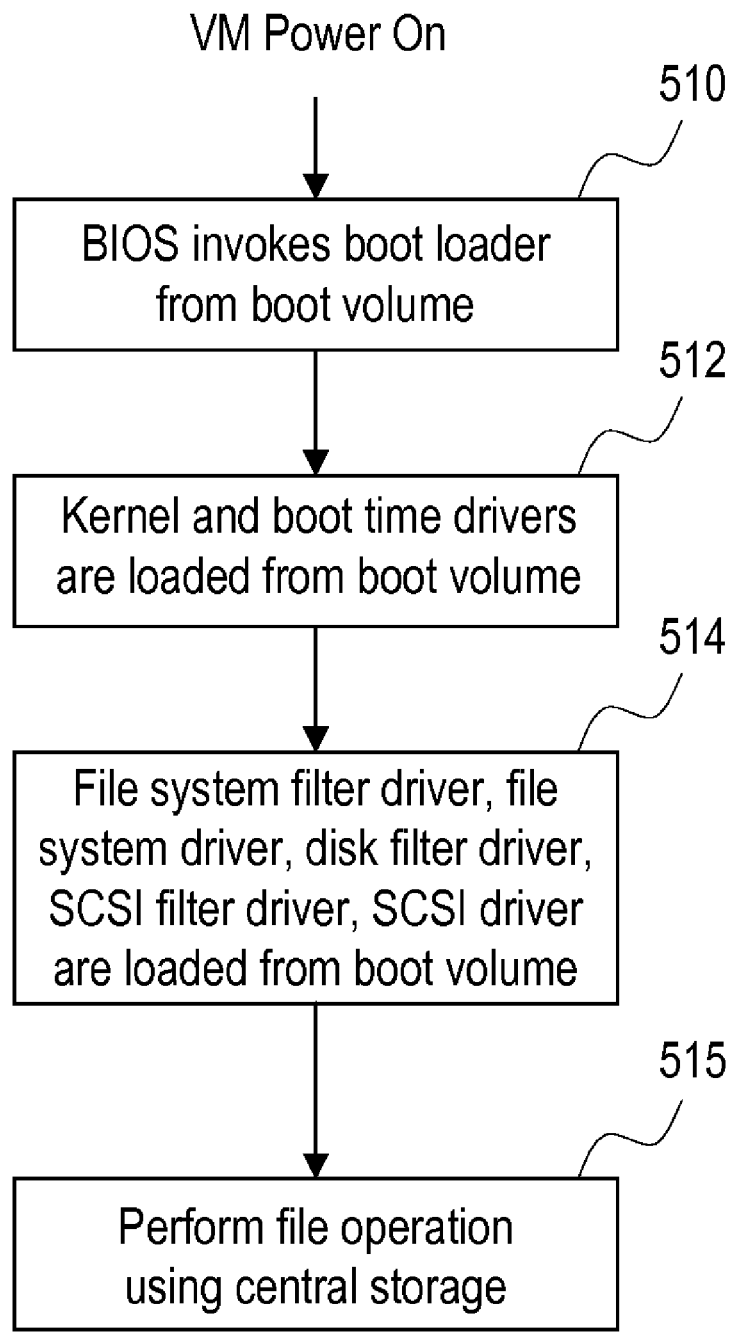
FIG. 5A illustrates another process for loading an operating system from a central storage unit.

Another process for loading an operating system into system memory from a central storage unit is illustrated in FIG. 5A. The process begins at step 510 with the system BIOS (Basic Input/Output System) invoking a boot loader from a boot disk or, more generally, a boot volume. At step 512, the boot loader loads the kernel of the operating system and boot time drivers into system memory from the boot volume. At step 514, the boot loader also loads into system memory a file system filter driver, a file system driver, a disk filter driver, a SCSI filter driver, and a SCSI driver.

The file system filter driver is a software component that runs on top of the file system driver and maintains a map between block numbers and files on which input/output is performed. This map is a table that is loaded into system memory with the file system filter driver. This table associates block numbers with a file ID and an offset inside the file, and is modified every time the file layout information changes such as when a file is created, deleted, extended, truncated, etc. The file system driver is the driver for the native file system of the operating system, e.g., NTFS for Windows NT operating systems. The disk filter driver is a software component that runs below the file system driver and tags block input/output requests representing file input/output operations. Block input/output requests for metadata blocks (i.e., "metadata operations") are not tagged. The disk filter driver only sees block numbers and thus it employs the map between block numbers and files as maintained by the file system filter driver to distinguish between the different types of operations and perform the tagging. Tag information contains a flag indicating a file input/output operation, and the file ID and offset information obtained from the map. The SCSI filter driver examines the tags on the block input/output requests that it receives to differentiate between file input/output and metadata operations. The SCSI driver manages accesses to the local storage unit.

After the file system filter driver, the file system driver, the disk filter driver, the SCSI filter driver, and the SCSI driver have been loaded, operating system files that remain unloaded after step 514 are loaded into system memory from the central storage unit in step 515.

Figure 5B:
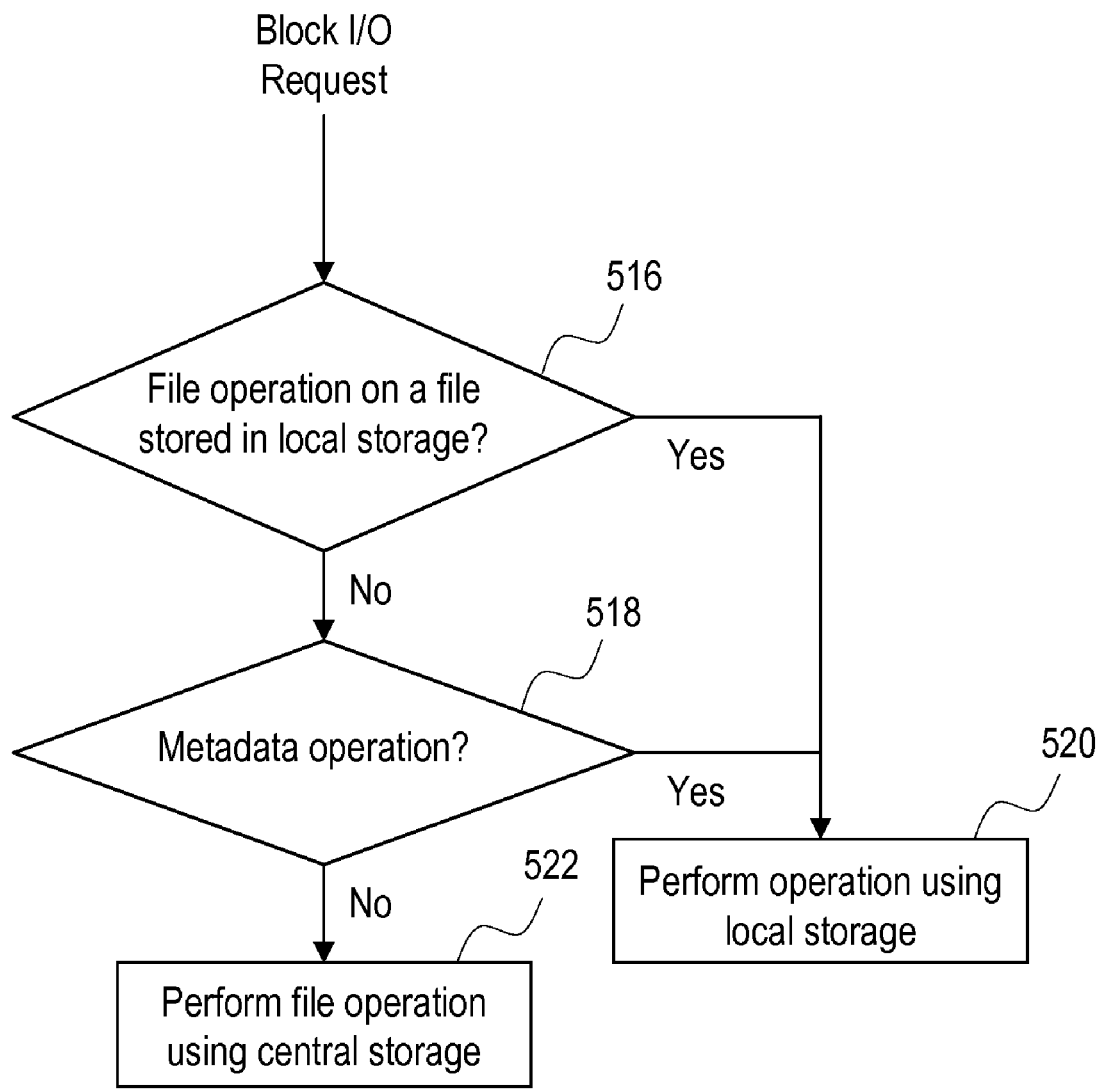
FIG. 5B illustrates a process for handling I/O requests from local storage or a central storage unit.

FIG. 5B illustrates a process for handling I/O requests from local storage or a central storage unit after the file system filter driver, the file system driver, the disk filter driver, the SCSI filter driver, and the SCSI driver have been loaded in connection with the loading of an operating system. First, the SCSI filter driver determines whether a block input/output request that it receives is an operation for a file stored in the local storage unit (step 516) or is a metadata operation (step 518). If either condition is true, the operation is carried out using the local storage unit at step 520. If both conditions are false, the operation is carried out using the central storage unit at step 522.

Figure 6:
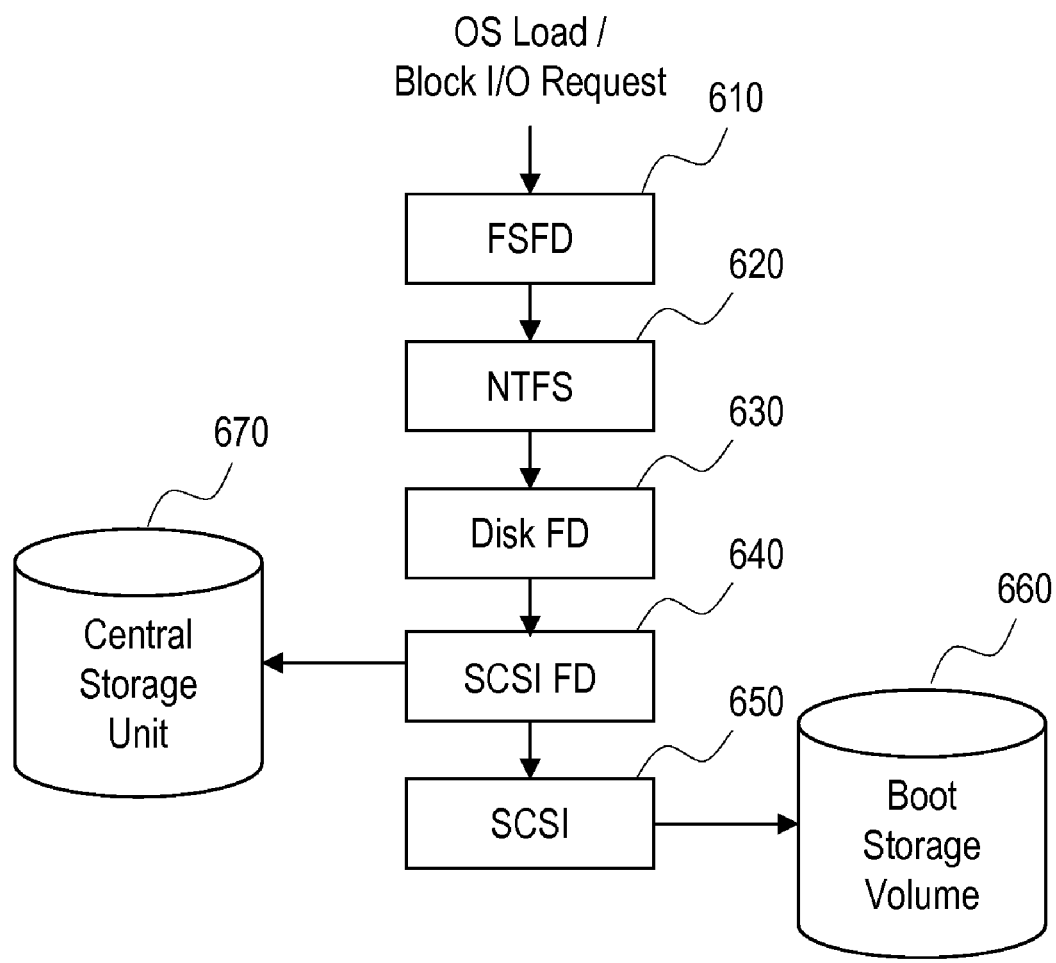
FIG. 6 schematically illustrates a file input/output process after a file system filter driver, a file system driver, a disk filter driver, a SCSI filter driver, and a SCSI driver have been loaded.

FIG. 6 schematically illustrates a file input/output process after the file system filter driver, the file system driver, the disk filter driver, the SCSI filter driver, and the SCSI driver have been loaded into system memory. In FIG. 6, the file system filter driver is shown as FSFD 610, the NTFS file system driver as NTFS 620, the disk filter driver as Disk FD 630, a SCSI filter driver as SCSI FD 640, and a SCSI driver as SCSI 650. Before Disk FD 630 and SCSI FD 640 are loaded into system memory, files are accessed and loaded from a boot storage volume 660. When a virtual machine is being booted, boot storage volume 660 may be a portion of a virtual disk associated with the virtual machine or may be streamed in using PXE/TFTP protocols. After Disk FD 630 and SCSI FD 640 are loaded into system memory and runs below NTFS 620, file input/output operations are directed to a central storage unit 670, whereas metadata operations and file input/output operations involving files stored in boot storage volume 660 are directed to boot storage volume 660. In the embodiment illustrated in FIG. 6, boot storage volume 660 is contained within local storage unit 120 and central storage unit 670 corresponds to central storage unit 130.

By permitting the booting of the virtual machines from central storage in the manner described above, most of the OS files can be stored centrally and shared by multiple virtual machines. As a result, management services provided on these shared files, such as anti-virus scanning, backup, patching, and versioning, need not be carried out multiple times, thus conserving CPU and memory resources of the individual virtual machines and simplifying administration of these files.

Figure 7:
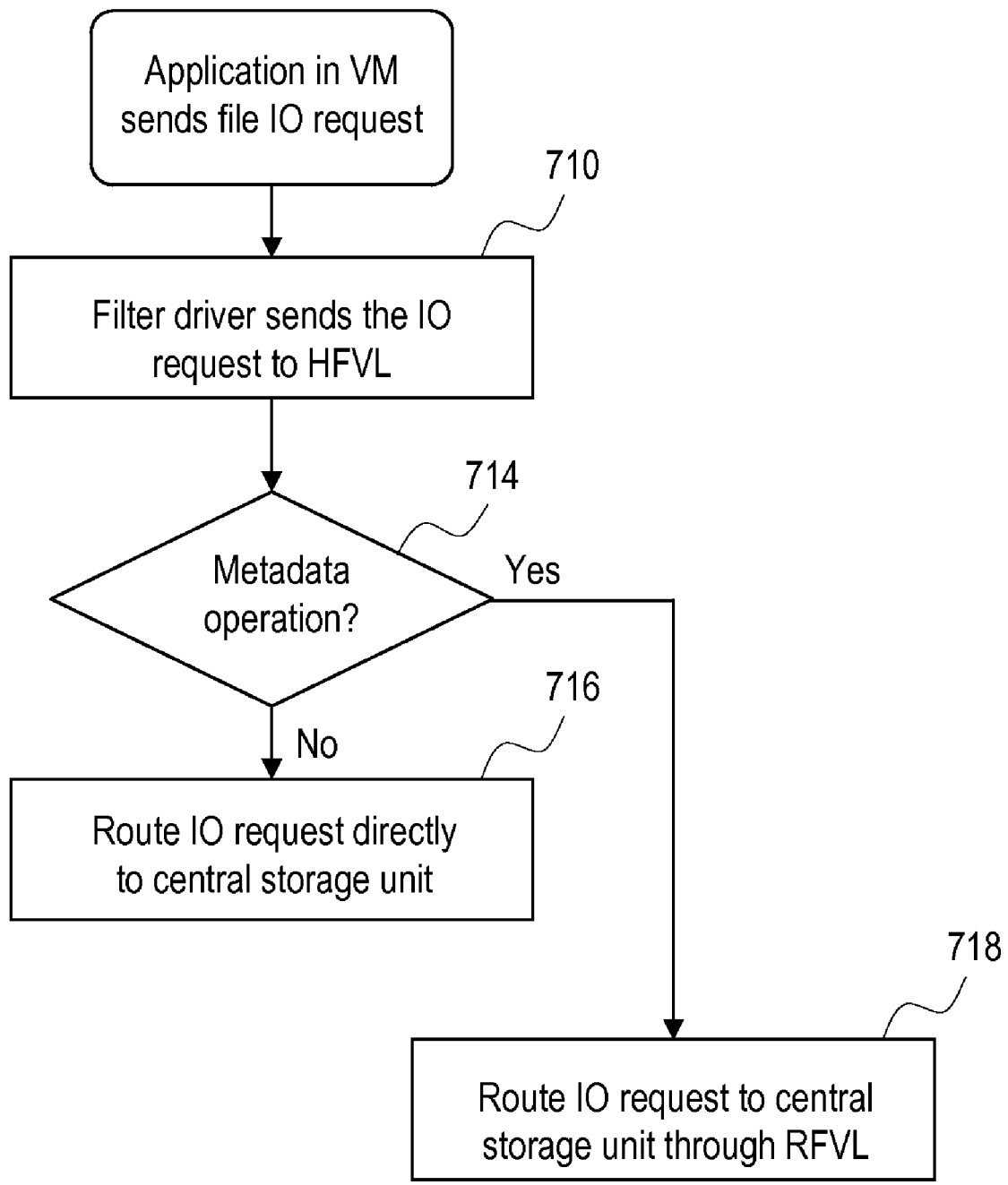
FIG. 7 illustrates a process for selectively routing a file IO request to a central storage unit or a switching layer.

FIG. 7 illustrates a process for selectively routing a file IO request to a central storage unit or a switching layer. This process is carried out by the server platform that is hosting one or more virtual machines in response to a file IO request made by an application running in a virtual machine. At step 710, a filter driver of the virtual machine (either a file system filter driver or a disk filter driver) sends the file IO request to HFVL 210. HFVL 210 evaluates the file IO request and determines whether the file IO request is a data operation or a metadata operation (step 714). A data operation includes a read operation and a write operation. A metadata operation includes file open, file create, file delete, rename, set file attributes, create link, and other file operations known in the art that require a file path. If the file IO request is a data operation, it is routed directly to central storage unit 130 through IO path 121 (step 716). If the file IO request is a metadata operation, it is routed to RFVL 230 of switching layer computer 220 through IO path 122 (step 718).

Figure 8:
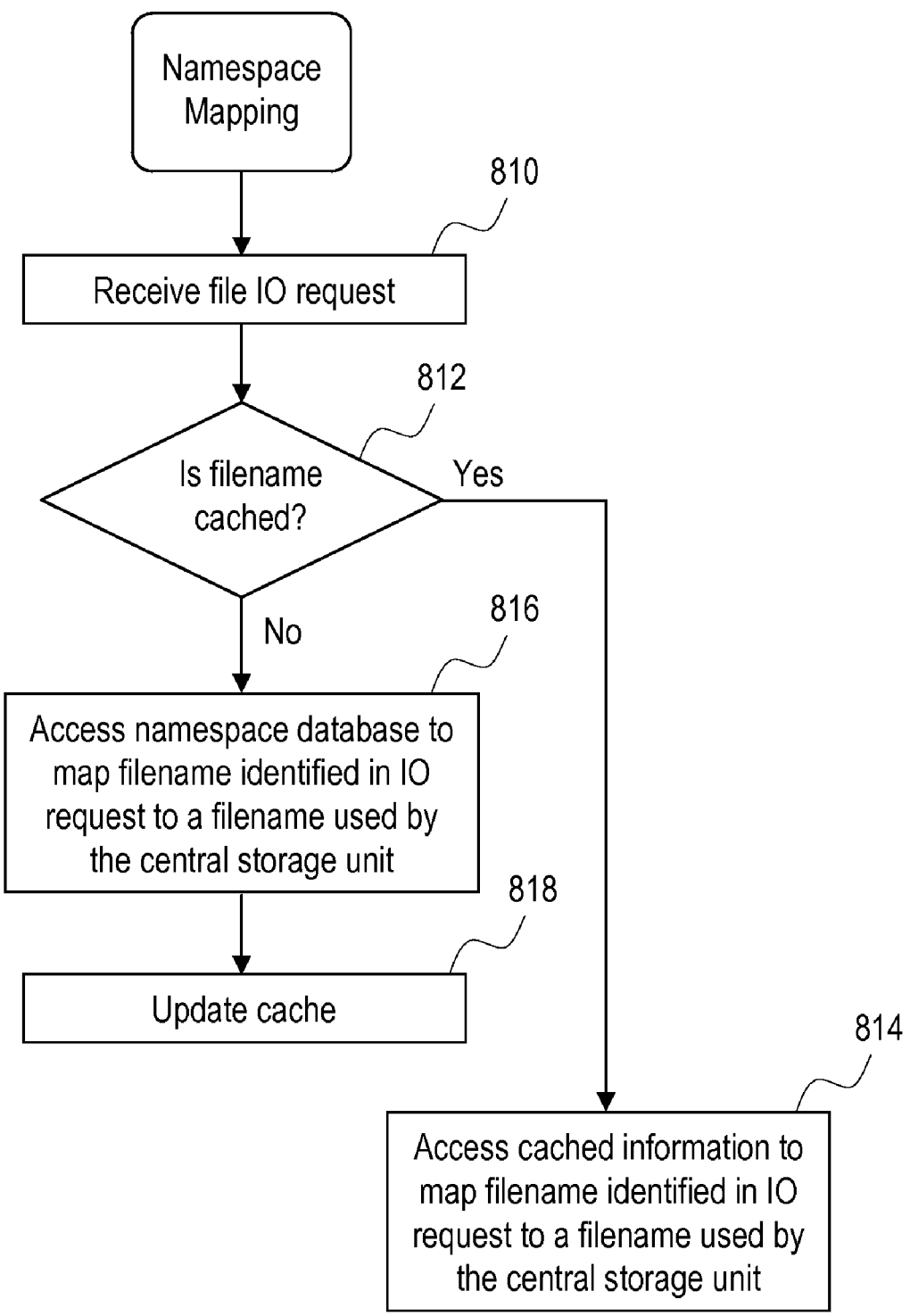
FIG. 8 illustrates a process for namespace mapping.

FIG. 8 illustrates a process for namespace mapping. This process is initiated at HFVL 210 in response to a file IO request, such as file open, file close, and file rename requests (step 810). At step 812, HFVL 210 determines if the namespace mapping information for the filename specified in the file IO request is stored in cache memory unit 215. If so, the cached mapping information is accessed and used to resolve the filename used by central storage unit 130 (step 814). If the filename specified in the file IO request is not stored in cache memory unit 215, step 816 is carried out by RFVL 230. At step 816, RFVL 230 accesses namespace database 240 and maps the filename specified in the file IO request to a filename used by central storage unit 130. This mapping information is then returned to HFVL 210 and HFVL 210 updates cache memory unit 215 with this information. During dynamic namespace virtualization, when RFVL 230 updates namespace database 240, RFVL 230 signals each HFVL 210 to invalidate the namespace maps stored in cache memory unit 215.

In the embodiments described above, guest applications and guest operation system of a virtual machine use the file system driver for all of its file access needs. The file system driver forwards these requests to HFVL 210. The following are some examples of how HFVL handles some of these requests.

Open File. HFVL 210 looks into cache memory unit 215 to resolve the VM specific file path to file path of central storage unit 130. If found, HFVL 210 uses the cached information and interacts with the storage server to open the file and notifies RFVL 230 about the opening of the file. If not, HFVL 210 communicates with RFVL 230 to resolve the file path. It then adds this entry to its cache memory unit 215. For example, an application executing in a VM tries to open c:foobar.txt. This open call gets routed to HFVL 210 via the file system driver. HFVL 210 examines its cache memory unit 215 to resolve \foo\bar.txt. If this information is not available, it sends the name resolution request to RFVL 230. RFVL 230 in turn looks into namespace database 240 for the VM specific namespace map and resolves the path to \server1\share3\snapshot7\vm9\foo\bar.txt and returns this path to HFVL 210. HFVL 210 then forwards the open request to server1 of central storage unit 130 with path \share3\snapshot7\vm9\foo\bar.txt.

Create File. HFVL 210 notifies RFVL 230 about a request to create new file/directory. Based on which VM is creating the new file/directory and the configuration policies for that VM, RFVL 230 chooses a file server/share and a system wide unique file/directory name. It then creates a mapping entry between the file/directory name that the VM intends to create and the name RFVL 230 has chosen for that filename in namespace database 240. RFVL 230 then returns to the requesting HFVL 210 its chosen name.

Read/Write. Before a read or write operation can be carried out, a file is opened in the manner described above. This means that the file path to central storage unit 130 has been resolved and stored in-memory or in cache memory unit 215. This file path is used by HFVL 210 to transfer data to/from central storage unit 130 directly through IO path 121 without involving RFVL 230.

File Close. HFVL 210 notifies RFVL 230 about the closing of the file.

File Delete. HFVL 210 notifies RFVL 230 about the deletion of the file. RFVL 230 deletes the mapping between the VM specific file path to file path of central storage unit 130 from namespace database 240.

Namespace mapping, as described herein, allows sharing of files between VMs, whether the VMs are running on the same host computer or different host computers. Also, updates to the primary namespace map maintained in namespace database 240 can be made to reflect changes in file sharing. For example, if two VMs are created from the same template, they begin sharing all of the files. If a VM tries to write to a file, the shared file is copied to a private file (one that is not shared) and the private file is written to. The private file is owned by the VM that is writing to it.

The namespace map also supports file deduplication process. This process can be carried out within central storage unit 130 or by any other server that has access to central storage unit 130, such as server platform 110 or switching layer computer 125 or MPF computer 127, and entails comparing files stored in central storage unit 130 to determine those files that are identical. Once files are determined to be identical, APIs in RFVL 230 are invoked to change the namespace maps so that multiple VM specific file paths point to each of the files that are found to be identical in central storage unit 130.

Figure 9:
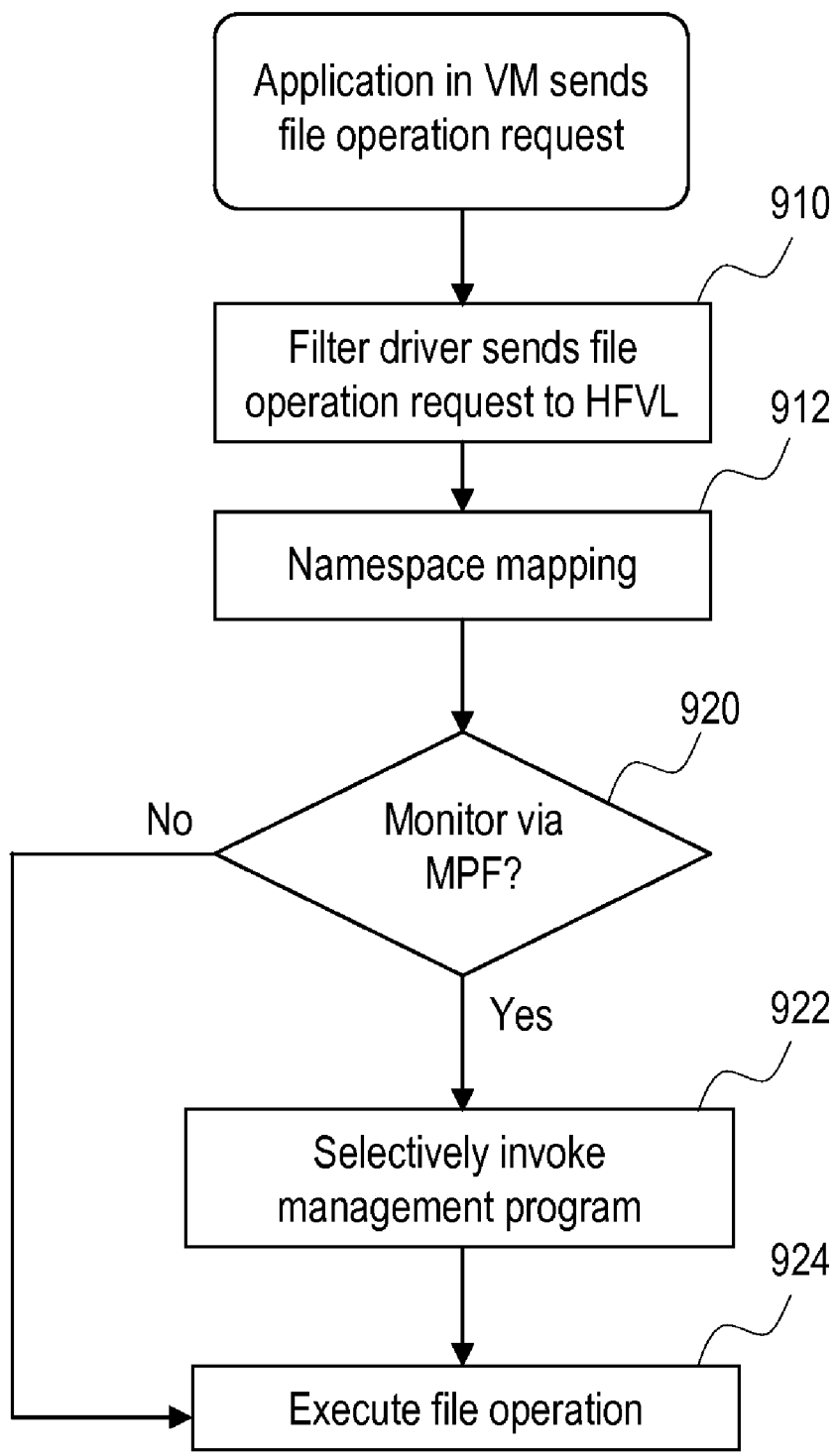
FIG. 9 is a flow diagram illustrating a method for managing virtual machines according to an embodiment of the invention.

FIG. 9 is a flow diagram illustrating a method for managing virtual machines according to an embodiment of the invention. At step 910, a filter driver of the virtual machine (either a file system filter driver or a disk filter driver) of a virtual machine sends a file operation request to HFVL 210. HFVL 210 forward this request to RFVL 230 to resolve the filename (step 912). Namespace mapping is carried out in the manner described above with reference to FIG. 8. At step 920, RFVL 230 determines if a management program has registered a callback for the file operation that has been requested. If so, at step 922, RFVL 230 notifies MPF 250 about this file operation with the resolved filename. MPF 250 invokes the callback registered by the management program and the management program accesses the file directly from central storage unit 130 using the resolved filename and executes its program on the file. Then, at step 924, the requested file operation is executed. If one of the management services has not registered a callback for the file operation that has been requested, step 922 is skipped and the flow jumps to step 924.

An example of the method shown in FIG. 9 is the anti-virus use case. Anti-virus software generally monitors file IO metadata operations, such as file open, file close, and file rename requests. In response to these operations, the anti-virus software performs anti-virus scanning on the file named in the request. The anti-virus software is running on a computer that is separate (either on a different virtual machine or a different physical server) from the one that issued the request, and has registered itself with MPF 250 for file open, file close, and file rename operations.

An application running in a virtual machine tries to open a file, example.exe. The open request is received by the virtual machine. The filter driver of the virtual machine (either the file system filter driver or the disk filter driver) forwards this request to HFVL 210 for additional processing. HFVL 210 forward this request to RFVL 230 to resolve the filename. RFVL 230 is aware that the anti-virus server has registered a callback for file open request and notifies MPF 250 about this open request with the resolved filename. MPF 250 invokes the open callback registered by the anti-virus server. Anti-virus server then opens the file from central storage unit 130 directly using the resolved filename and scans the file. It returns the status of the scan back to MPF 250, which returns it back to RFVL 230. If no virus is detected, RFVL 230 returns the resolved file name to HFVL 210 which then goes and opens the file from central storage unit 130 and returns the status back to the filter driver.

In case of operations on infected files, the steps remain the same until the anti-virus scan. Once the anti-virus scan determines that the file is infected, it returns the infected status to MPF 250. MPF 250 notifies RFVL 230 and the system administrator about the infection. RFVL 230, on seeing the error status, returns to HFVL 210 immediately without returning the resolved filename. HFVL 210 returns the failed open file request to the filter driver and also notifies the guest agent about the infected file. The guest agent pops up a message box informing the user about the file infection. In an alternative embodiment, the anti-virus software disinfects the infected file, in which case, the return path is similar to the normal file operation path.

For an on-demand virus scan, the namespace database 240 is accessed to resolve the filenames and the anti-virus software is invoked directly to scan the files from the central storage unit 130 using the resolved names.

A computer on which management programs are executed is referred to herein as a "management services computer." In one embodiment of the invention, MPF computer 127 serves as the management services computer. In other embodiments, management services computer may be a virtual machine or a computer that is physically different from MPF computer 127.

Figure 10:
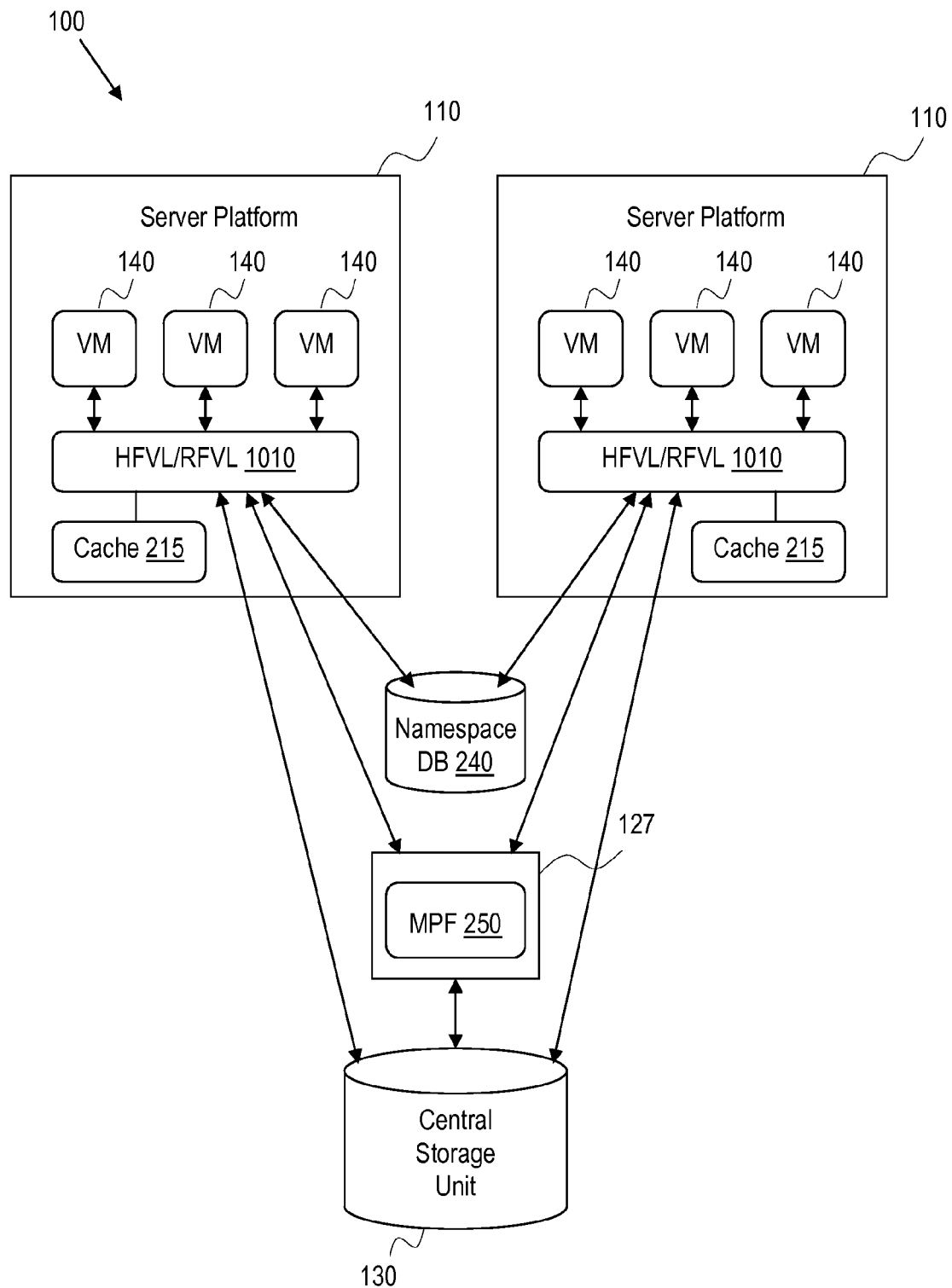
FIG. 10 illustrates an alternative embodiment of the invention.

FIG. 10 illustrates an alternative embodiment of the invention. In this embodiment, the functions of HFVL 210 and RFVL 230 are carried out by a single software layer, HFVL/RFVL 1010, which is implemented in each server platform 110 and communicates with namespace database 240.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. In a system including a host computer having one or more virtual machines configured therein, a primary storage unit for each of the virtual machines, and a central storage unit, a method for managing the virtual machines in a central manner, comprising:

receiving a file operation requested by a virtual machine including a resolved filename determined from a namespace map that provides a mapping of filenames used by the virtual machines to filenames used by the central storage unit, the namespace mapping allowing multiple virtual machines to share a file associated with the resolved filename that is stored in the central storage unit;

in response to receiving the file operation, determining if a management program is registered with the file operation and should be invoked for this file operation, wherein the management program provides a management service that needs to be performed before the file operation is performed; and if the management program is registered and should be invoked, invoking the management program on the file stored in the central storage unit using the resolved filename, wherein the management program is configured to access the file from the central storage unit using the resolved filename and execute a management service operation associated with the management service for the accessed file different from the file operation requested before the file operation is performed.

2. The method according to claim 1, wherein the management program comprises one of anti-virus scanning, backup, patching, and versioning.

3. The method according to claim 2, wherein the file comprises files of a guest operating system that are loaded into the multiple virtual machines.

4. The method according to claim 1, wherein the file operation comprises a metadata operation, the method further comprising:
  detecting the metadata operation on the file stored in the central storage unit,
  wherein the management service operation is executed on said file in response to said detecting.

5. The method according to claim 4, wherein the metadata operation requires a file path.

6. The method according to claim 4, further comprising:
  translating a filename of said file used by a virtual machine into the resolved filename of said file used by the central storage unit with the namespace map,
  wherein the management service operation is executed on said file in response to said detecting using the resolved filename.

7. The method according to claim 1, wherein filenames used by different virtual machines map to the resolved filename of the shared file in the namespace map.

8. The method according to claim 1, wherein a result of the executed management service operation for the management service on the file stored in the central storage unit using the resolved filename is applicable to other file operation requests from other virtual machines that share the file associated with the resolved filename.

9. In a system including a host computer having one or more virtual machines configured therein, a primary storage unit for each of the virtual machines, and a central storage unit, a method for managing the virtual machines using management programs that are executed in a central location, comprising:
  detecting a file operation requested by a virtual machine;
  translating a filename used by the virtual machine into a filename used by the central storage unit, the translating allowing multiple virtual machines to share a file associated with the translated filename used in the central storage unit;
  in response to detecting the file operation, determining if a management program is registered with the file operation and should be invoked for the file operation, wherein the management program provides a management service that needs to be performed before the file operation is performed; and
  if the management program is registered and should be invoked, notifying a management framework that the file operation has been detected for the file associated with the translated filename used by the central storage, the management framework configured to access the file stored at the central location that has the translated filename and execute a management service operation associated with the management service for the accessed file before the file operation is performed, wherein the management service operation is different from the file operation requested.

10. The method according to claim 9, wherein the management program comprises one of anti-virus scanning, backup, patching, and versioning.

11. The method according to claim 10, wherein the file is one of files of a guest operating system that are stored in the central storage unit and shared by multiple virtual machines.

12. The method according to claim 9, wherein the file operation requires a file path.

13. The method according to claim 9, further comprising:
  maintaining a namespace map that provides a mapping of filenames used by the virtual machines to filenames used by the central storage unit; and
  translating the filename using the namespace map.

14. The method according to claim 13, wherein filenames used by different virtual machines map to the translated filename used by the central storage unit in the namespace map.

15. A system for managing virtual machines in a centralized manner, comprising:
  a host computer having one or more virtual machines configured therein;
  a switching layer computer connected to the host computer and configured to:
    manage a namespace map for the one or more virtual machines in the host computer, the namespace map defining a mapping of filenames used by the one or more virtual machines in the host computer to filenames used by a central storage unit;
    detect a file operation requested by a virtual machine;
    resolve a filename used by the virtual machine into a resolved filename used by the central storage unit, the resolving allowing multiple virtual machines to share a file associated with the resolved filename used in the central storage unit; and
    in response to detecting the file operation, determining if a management program is registered with the file operation and should be invoked for the file operation, wherein the management program provides a management service that needs to be performed before the file operation is performed; and
  a management services computer that is programmed to access the file using the resolved filename upon being invoked by the switching layer computer if the management program is registered and should be invoked, wherein the management program is configured to execute a management service operation associated with the management service for the accessed file before the file operation is performed, the management service operation being different from the file operation requested.

16. The system according to claim 15, wherein the management program comprises one of anti-virus scanning, backup, patching, and versioning.

17. The system according to claim 15, wherein the management program is invoked upon detection of a predetermined metadata operation that is routed to the switching layer computer.

18. The system according to claim 17, wherein the switching layer computer is programmed to notify the management services computer when it detects that the predetermined metadata operation has been routed thereto.

19. The system according to claim 15, further comprising:
an additional host computer having one or more virtual machines configured therein, connected to the switching layer computer and the central storage unit,
wherein the namespace map managed by the switching layer computer also provides a mapping of filenames used by the virtual machines in the additional host computer to filenames used by the central storage unit.

20. The system according to claim 19, wherein, in the namespace map, the filename used by the virtual machine in the host computer and a filename used by a virtual machine in the additional host computer map to the resolved filename used by the central storage unit.

21. The system according to claim 19, wherein the host computer is programmed to execute programs for locally managing the files of the one or more virtual machines that are configured therein, and the additional computer is programmed to execute programs for locally managing the files of the virtual machines that are configured therein.

* * * * *